(12) United States Patent
Thein

(10) Patent No.: US 11,139,865 B2
(45) Date of Patent: Oct. 5, 2021

(54) METHOD, PROGRAM INSTRUCTIONS, STORAGE MEDIUM, AND DEVICE

(71) Applicant: Robert Bosch GmbH, Stuttgart (DE)

(72) Inventor: Christoph Thein, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/120,683

(22) Filed: Dec. 14, 2020

(65) Prior Publication Data

US 2021/0184732 A1 Jun. 17, 2021

(30) Foreign Application Priority Data

Dec. 14, 2019 (DE) .......................... 102019219644.6

(51) Int. Cl.
*H04B 7/0408* (2017.01)
*H04L 5/00* (2006.01)
*H04W 16/14* (2009.01)
*H04W 72/04* (2009.01)
*H04L 27/26* (2006.01)

(52) U.S. Cl.
CPC ......... *H04B 7/0408* (2013.01); *H04L 5/0048* (2013.01); *H04L 27/2602* (2013.01); *H04W 16/14* (2013.01); *H04W 72/046* (2013.01)

(58) Field of Classification Search
CPC ..... H04W 64/00; H04W 4/029; H04W 4/023; H04W 4/80; H04W 88/08; H04W 16/14; H04W 36/32; H04W 40/20; H04W 72/046; H04W 12/63; H04B 7/0408; H04L 5/0048; H04L 27/2602
See application file for complete search history.

(56) References Cited

U.S. PATENT DOCUMENTS

| | | |
|---|---|---|
| 6,694,142 B1* | 2/2004 | Kuwahara ................. G01S 5/14 342/357.29 |
| 2007/0087761 A1 | 4/2007 | Anjum et al. |
| 2008/0130604 A1 | 6/2008 | Boyd |
| 2009/0221299 A1 | 9/2009 | MacDonald et al. |
| 2015/0087330 A1 | 3/2015 | Prechner et al. |
| 2017/0257839 A1 | 9/2017 | Alles et al. |

* cited by examiner

*Primary Examiner* — Rahel Guarino
(74) *Attorney, Agent, or Firm* — Michael Best & Friedrich LLP

(57) ABSTRACT

A method is provided for localizing a plurality of wireless terminal devices of a communication network, wherein the method comprises: providing reception signals (s; s_AP1, s_AP2, s_AP3) which respectively comprise superposed radio signals which were wirelessly received by a respective one of a plurality of receivers which are arranged spatially separated from one another, wherein the plurality of superposed radio signals originates from different ones of the wireless terminal devices; reconstructing the radio signals in the form of reconstructed radio signals (rs; rs1, rs2), as a function of the respective reception signal (s; s_AP1, s_AP2, s_AP3); and estimating the spatial positions (pos; pos_UE1, pos_UE2) of the wireless terminal devices as a function of the reconstructed radio signals (rs; rs1, rs2).

8 Claims, 7 Drawing Sheets

METHOD, PROGRAM INSTRUCTIONS, STORAGE MEDIUM, AND DEVICE

BACKGROUND OF THE INVENTION

The present invention relates to a method for localizing a plurality of wireless terminal devices of a wireless communication network, program instructions, and a non-volatile, computer-readable storage medium, and a device for localizing a plurality of wireless terminal devices.

In deviation from known cell-supported media access methods, it is known to allow collisions on radio channels. These collisions reduce the SINR, and thus the accuracy of localization.

SUMMARY OF THE INVENTION

The object of the present invention is achieved via a method, program instructions, a storage medium, and a device. Advantageous refinements are specified in the subclaims and are furthermore to be found in the following description of exemplary embodiments. A first aspect of the description relates to a method for localizing a plurality of wireless terminal devices of a wireless communication network, wherein the method comprises: providing reception signals which respectively comprise superposed radio signals which were wirelessly received by a respective one of a plurality of receivers which are arranged spatially separated from one another, wherein the plurality of superposed radio signals originates from different ones of the wireless terminal devices; reconstructing the signals in the form of reconstructed radio signals, as a function of the respective reception signal; and estimating the spatial positions of the wireless terminal devices as a function of the reconstructed radio signals.

Advantageously, colliding radio signals are thus used to estimate the spatial positions of mobile or stationary terminal devices. As a result, the position determination is no longer dependent on collision-free measurements, but rather can also be used with radio protocols which allow collisions during transmission. This means that the effect of collisions of a radio channel on the localization of terminal devices is reduced.

The mass production of radio-based terminal devices which, for example, can only transmit but which cannot receive, is only made possible by means of the provided localization or positioning of the terminal device, since, without localization of the respective terminal device, many downstream functions cannot be carried out or can be carried out only to a limited degree. In particular, the spatial allocation of terminal devices comprising, for example, sensors, is essential for certain applications.

One advantageous example is characterized in that the method comprises: decoding a plurality of first packets as a function of the respectively allocated reception signal, encoding a plurality of first radio signals as a function of the respective one of the plurality of first packets, and determining the plurality of reconstructed second radio signals by removing the allocated first encoded radio signal from the allocated reception signal.

Advantageously, the superposed radio signals are separated from one another by means of the reconstruction. Thus, a kind of interference suppression occurs in order to localize the terminal devices.

One advantageous example is characterized in that the method comprises: determining that the first radio signal received in the reception signal has a higher SINR value and/or a higher received transmission power in comparison to the second radio signal contained in the reception signal, and reconstructing the second radio signal before the reconstruction of the first radio signal, as a function of the aforementioned determination.

Advantageously, the first packet is used for the decoding which is brought forward in time. The potentially difficult reconstruction of the second radio signal due to the reduced reception power benefits from this.

One advantageous example is characterized in that the method comprises: reconstructing the first radio signal by removing at least the second reconstructed radio signal from the allocated reception signal.

Advantageously, the previously reconstructed radio signals are used for improving the estimation of the other radio signals, like the first radio signal.

One advantageous example is characterized in that the method comprises: providing at least one channel estimation, wherein the at least one channel estimation characterizes a state of a radio channel between one of the terminal devices and one of the receivers; and encoding the at least one first radio signal as a function of the allocated decoded first packet and as a function of the respective allocated channel estimation.

By means of the channel estimation which, for example, is provided by the allocated receiver, the encoding of the first radio signal is improved, since the actual channel conditions are used on the decoded first packet.

One advantageous example is characterized in that the method comprises: providing spatial positions of the wireless receivers; determining distances between one of the wireless terminal devices and a respective one of the wireless receivers, as a function of the reconstructed radio signals which are allocated to the one wireless terminal device; and estimating the spatial position of the one of the wireless terminal devices as a function of the determined distances and as a function of the spatial positions of the wireless receivers.

For trilateration or multilateration, the calculation takes place based on the distances, which require either the arrival time or the frequency and the wave number of a received transmission.

A second aspect of the description describes program instructions which execute the method according to the first aspect during execution on a processor.

A third aspect of the description relates to a nonvolatile, computer-readable storage medium on which the program instructions according to the second aspect are stored.

A fourth aspect of the description relates to a device for localizing a plurality of wireless terminal devices of a wireless communication network, wherein the device comprises: a processor, and a nonvolatile, computer-readable storage medium which is linked to the processor and which stores program instructions for execution by the processor, wherein the program instructions the instruct the processor: to provide reception signals which respectively comprise superposed radio signals which were wirelessly received by a respective one of a plurality of receivers which are arranged spatially separated from one another, wherein the plurality of superposed radio signals originates from different ones of the wireless terminal devices; to reconstruct the radio signals in the form of reconstructed radio signals, as a function of the respective reception signal; and to estimate the spatial positions of the wireless terminal devices as a function of the reconstructed radio signals.

DETAILED DESCRIPTION

Figure 1:
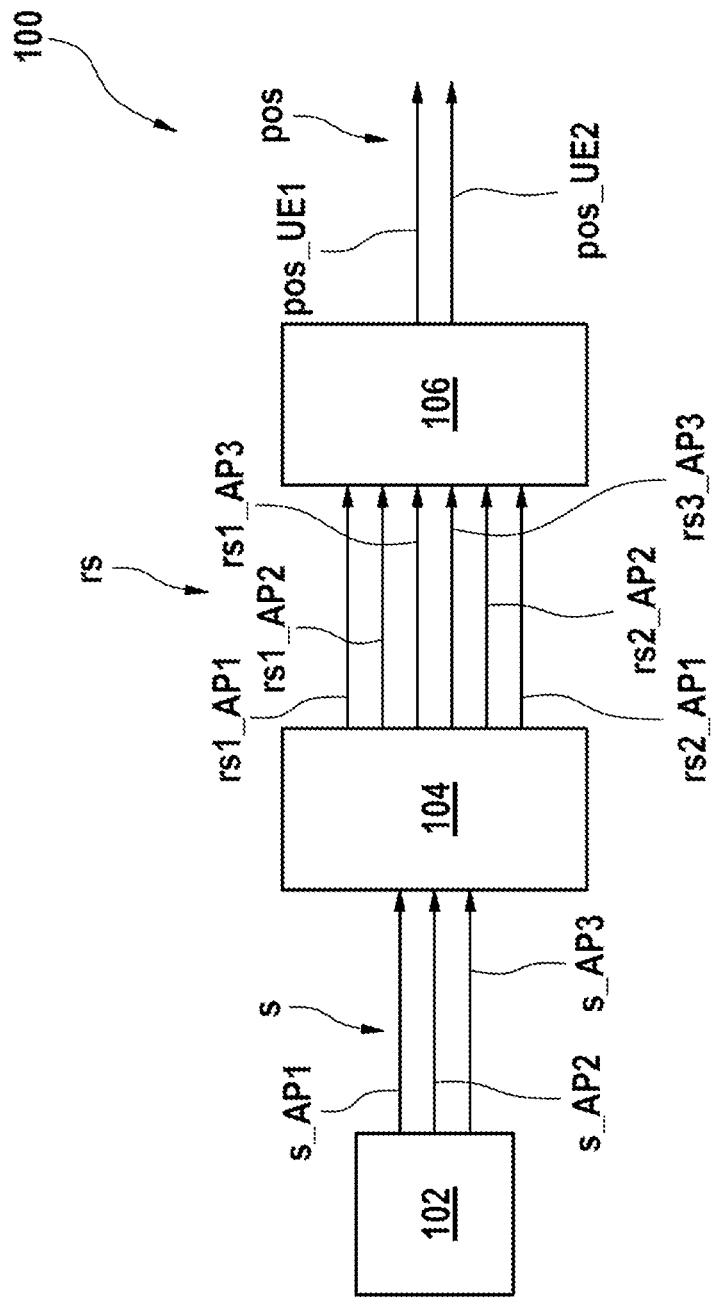
FIGS. 1 and 8 respectively depict a schematic block diagram of a device for localizing a plurality of wireless terminal devices.

FIG. 1 depicts a schematic block diagram of a device 100 for localizing a plurality of wireless terminal devices of a wireless communication network. The device 100 carries out a method corresponding to the block diagram.

A provision unit 102 provides reception signals s or s_AP1, s_AP2, s_AP3. The reception signals s respectively comprise superposed radio signals which were received wirelessly by a respective one of a plurality of receivers which are arranged spatially separated from one another. The plurality of superposed radio signals was generated by different ones of the wireless terminal devices and received by a respective receiver. The plurality of superposed radio signals uses radio resources which at least partially overlap. This means that the terminal devices operate according to a channel access method which allows collisions on the channel. This may be the case in particular for access methods which are not scheduled and which operate in a decentralized manner.

A signal estimator 104 reconstructs the radio signals which originate from the terminal devices and which are contained in the reception signals, in the form of reconstructed radio signals rs or rs1, rs2, as a function of the respective reception signal s or s_AP1, s_AP2, s_AP3.

A position estimator 106 estimates spatial positions pos or pos_UE1, pos_UE2 of the wireless terminal devices, as a function of the reconstructed radio signals rs or rs1_AP1 to rs1_AP3 or rs2_AP1 to rs2_AP3.

Figure 2:
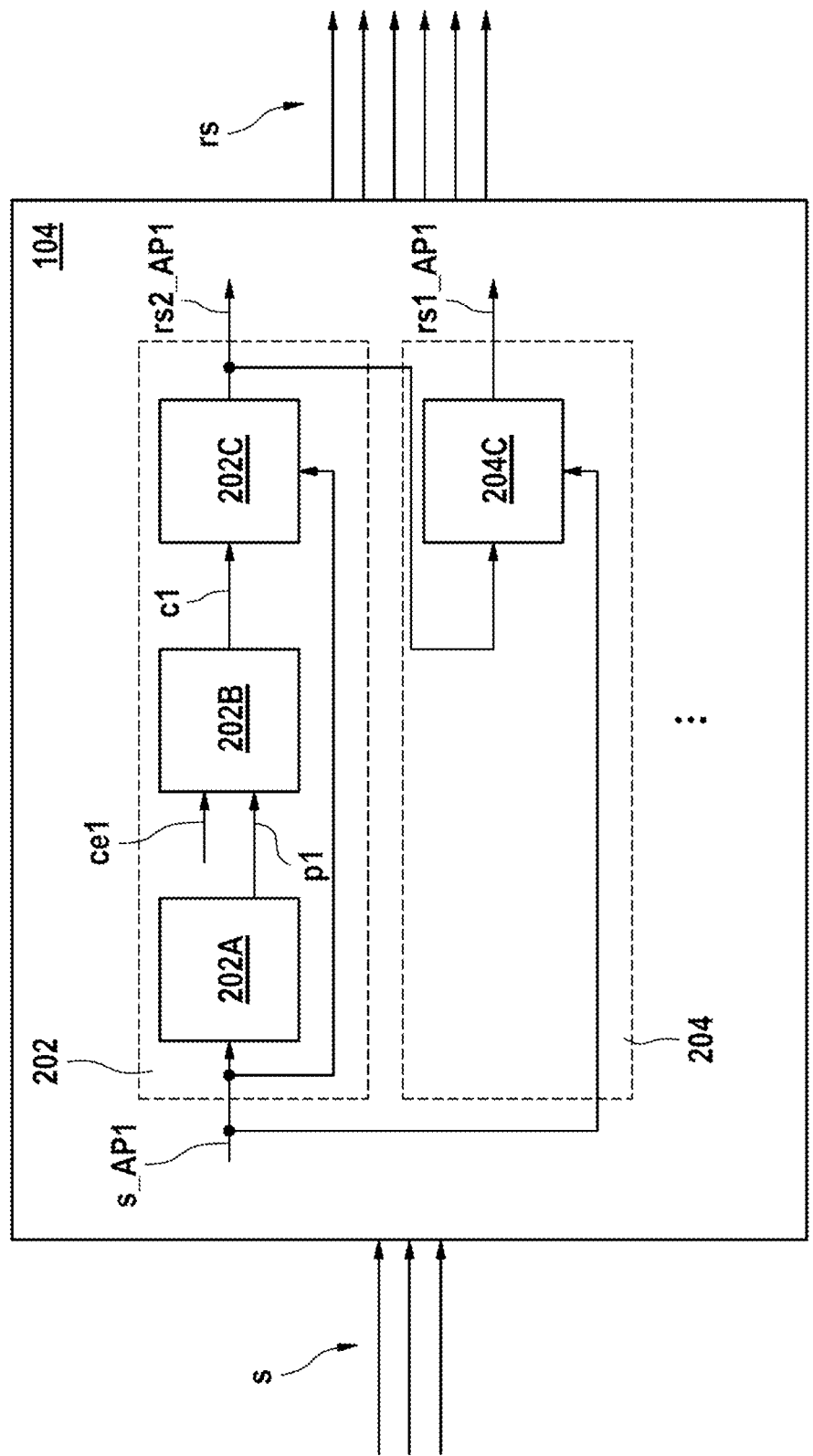
FIG. 2 depicts a schematic block diagram of a signal estimator.

FIG. 2 depicts a schematic block diagram of the signal estimator 104. The processing of one of the reception signal s_AP1 and the determination of the estimated radio signals rs2_AP1 and rs1_AP1 by means of blocks 202 and 204 is depicted by way of example. Of course, the further radio signals rs1_AP2, rs1_AP3, rs2_AP2, and rs2_AP3 are also determined by means of the signal estimator 104.

A decoder 202A decodes a first packet p1 as a function of the respectively allocated reception signal s1_AP1.

An encoder 202B encodes the first radio signal c1 as a function of the packet p1. For this purpose, a channel estimation ce1 which is available from the receiver can be used. By means of the channel estimation, the original waveform in the form of the first encoded radio signal c1 can be estimated. Thus, at least one channel estimation ce1 is provided, wherein the at least one channel estimation ce1 characterizes a state of the radio channel between one of the terminal devices UE1 and one of the receivers AP1, AP2, AP3, presently, the receiver AP1. Correspondingly, encoding of the at least the one first radio signal c1 takes place as a function of the allocated decoded first packet p1 and as a function of the respectively allocated channel estimation ce1.

A signal estimator 202C determines the reconstructed second radio signal rs2_AP1 by removing the allocated first encoded radio signal rs1a from the allocated reception signal s1. The reconstruction of the first radio signal rs1_AP1 takes place by removing at least the second reconstructed radio signal rs2_AP1 from the allocated reception signal s_AP1.

The sequence of the processing of the blocks 202 and 204 is time-coordinated in an example. For the coordination, it is determined that the first radio signal contained in the reception signal s has a higher SINR value and/or a higher received transmission power in comparison to the second radio signal contained in the reception signal s. If this is the case, the second radio signal rs2_AP1 is determined before the first radio signal rs1a_AP1.

The signal estimator 204C uses the result of the signal estimator 202C in that the reconstructed radio signal rs1_AP1 results from the subtraction of the reconstructed radio signal rs2_AP1 from the reception signal s_AP1.

In an example which is not depicted, the block 204 can be configured similarly to the block 202.

Figure 3:
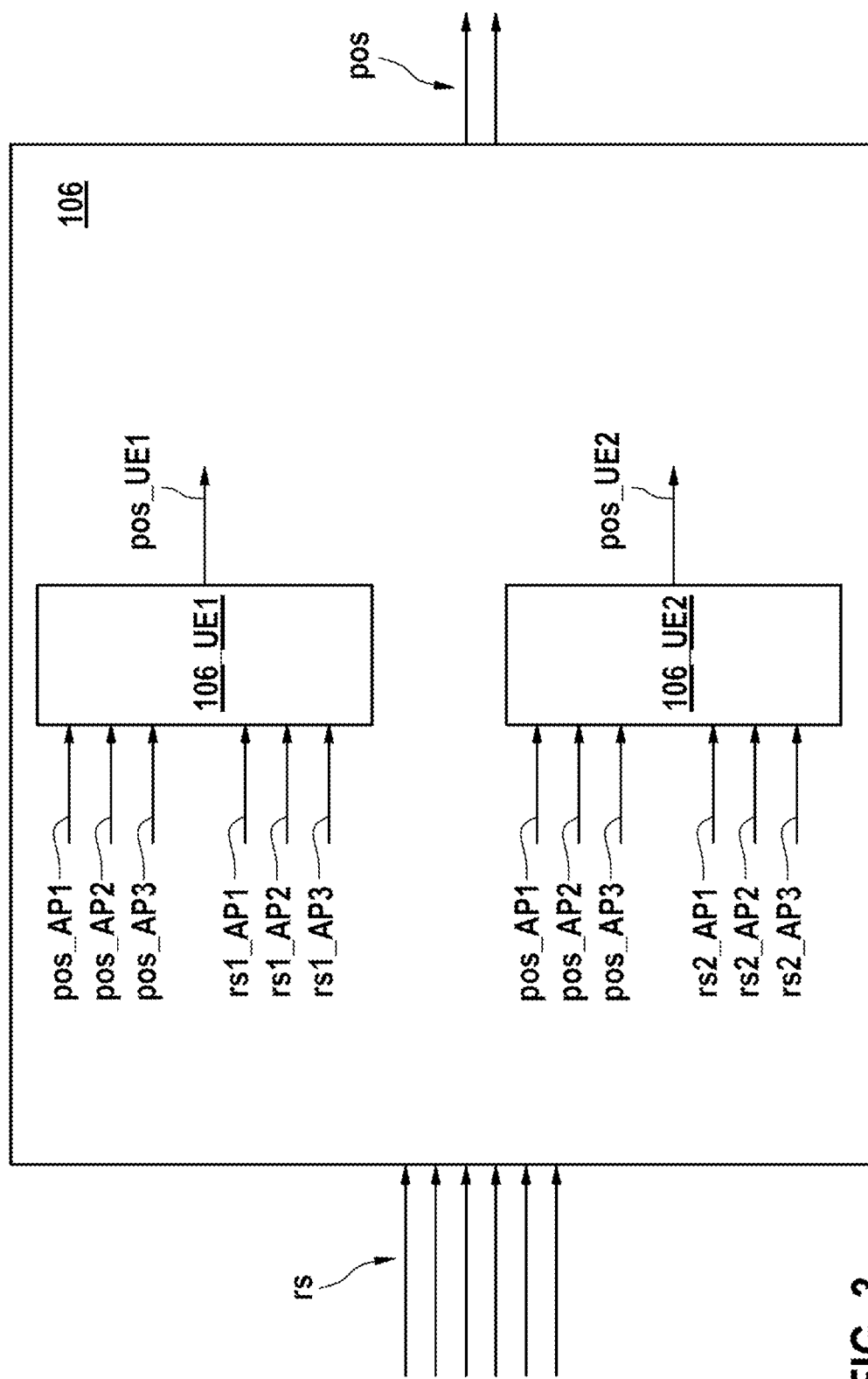
FIG. 3 depicts a schematic block diagram of a position estimator.

FIG. 3 depicts a schematic block diagram of the position estimator 106. The position estimator 106 comprises two position estimators 106_UE1 and 106_UE2 for a respective terminal device, by way of example. Of course, several or only one of the position estimators 106_UE1 and 106_UE2 may be present.

Spatial positions pos_AP1, pos_AP2, pos_AP3 of the wireless receivers AP1, AP2, AP3 are existent or are provided. For example, according to FIG. 4, distances d11, d12, d13 between one of the wireless terminal devices UE1 and a respective one of the wireless receivers AP1, AP2, AP3 are determined as a function of the reconstructed radio signals rs1_AP2, rs1_AP2, rs1_AP3 which are allocated to the one wireless terminal device UE1.

The spatial position pos1_UE1 of the one of the wireless terminal devices UE1 is, for example, estimated as a function of the determined distances d11, d12, d13, and as a function of the spatial positions pos_AP1, pos_AP2, pos_AP3 of the wireless receivers AP1, AP2, AP3.

Figure 4:
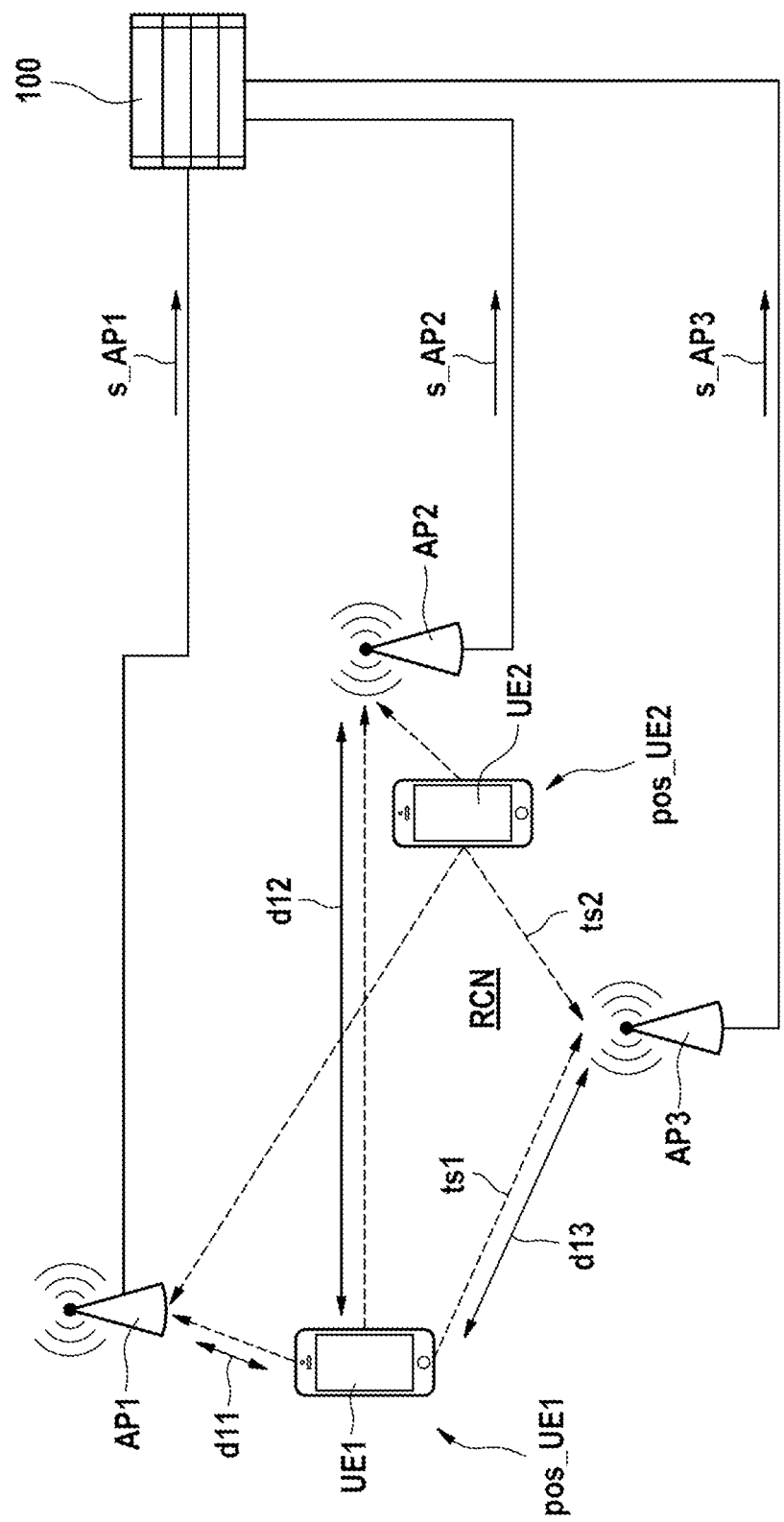
FIG. 4 depicts a wireless network in schematic form.

FIG. 4 depicts the wireless network RCN in schematic form. The terminal devices UE1 and UE2 emit a respective radio signal ts1, ts2 in a temporally overlapping manner. However, the radio signals ts1 and ts2 overlap not only temporally, but also in the area of a respective radio resource. The result of this is that the radio signals ts1 and ts2 collide on the associated radio channel.

The radio signals ts1 and ts2 are received by the receivers AP1 to AP3 at potentially different instants and having different power levels. The receivers AP1 to AP3 are, for example, stationary access points. The receivers AP1 to AP3 determine reception signals s_AP1 to s_AP3, in which the overlapping broadcast radio signals ts1 and ts2 are represented. The device 100 makes use of the fact that the overlapping broadcast radio signals ts1 and ts2 were received at different locations, in order to determine the positions pos_UE1 and pos_UE2.

Figure 5:
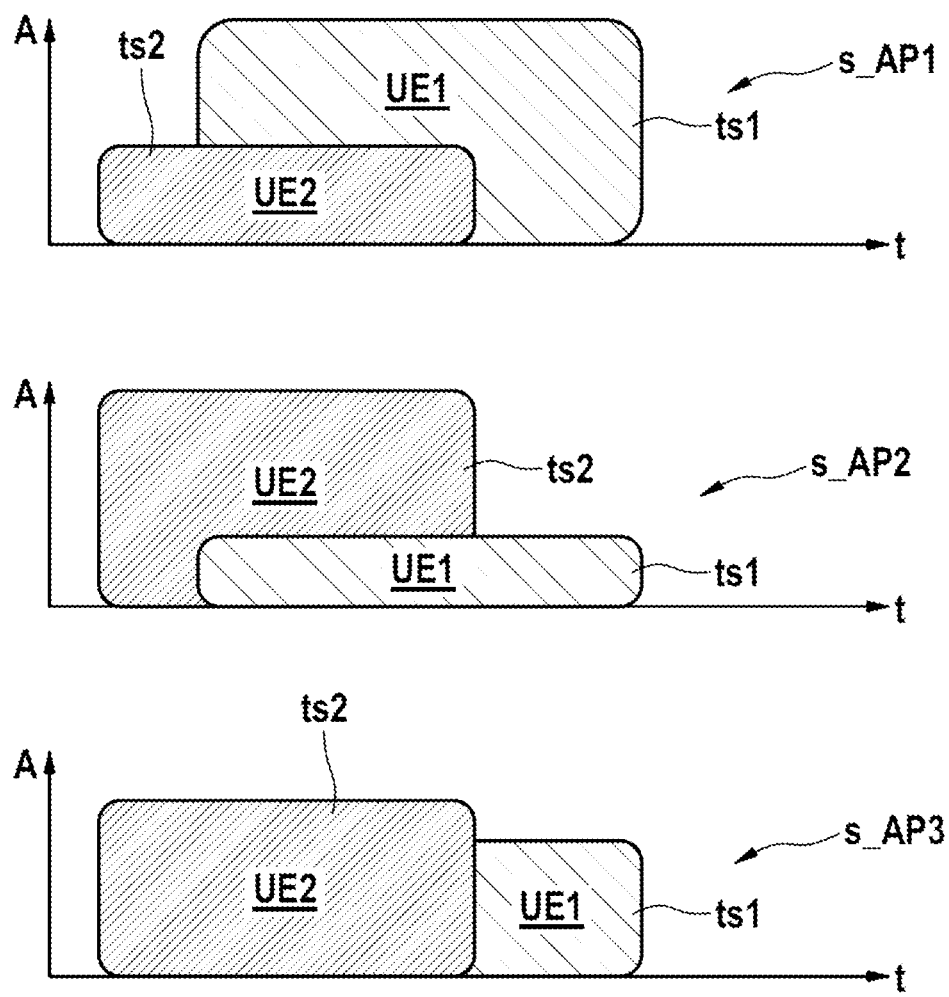
FIG. 5 depicts reception signals in schematic form.

FIG. 5 depicts reception signals which were picked up by the different receivers, in schematic form. An amplitude A is plotted over time t. The reception signal s_AP1 comprises a representation of the radio signal ts1, the amplitude of which is greater than, for example, the amplitude of the radio signal ts1 in the reception signal s_AP2, due to the short distance between the terminal device UE1 and the receiver AP1. On the other hand, the reception signal s_AP3 shows a comparatively less large amplitude difference between the represented radio signals ts1 and ts2, due to the approximately equally large distances shown in FIG. 4.

Figure 6:
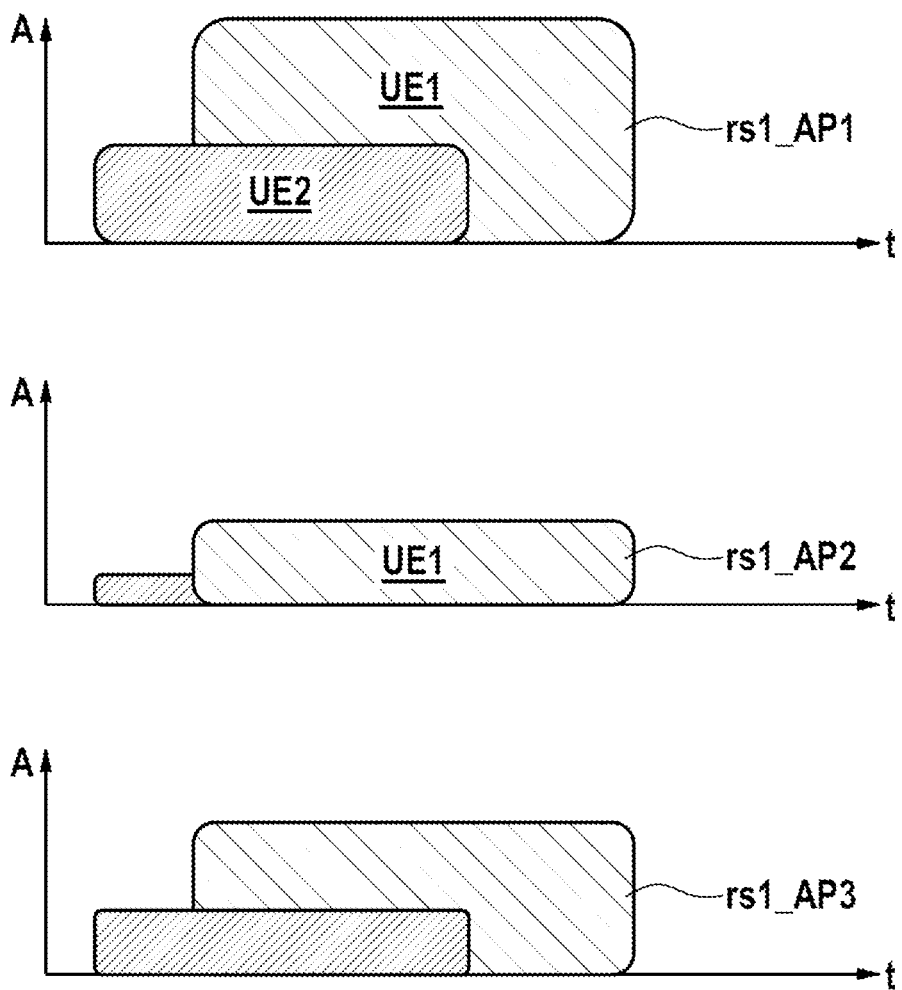
FIGS. 6 and 7 respectively depict reconstructed radio signals of a terminal device.
Figure 7:
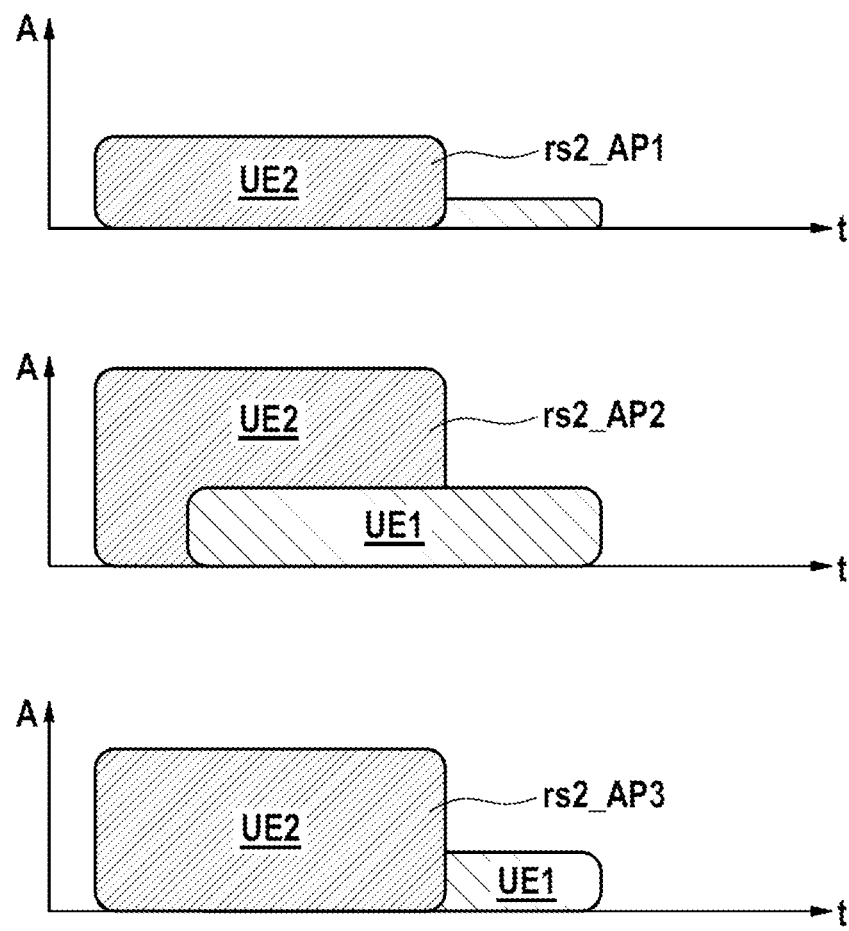

FIG. 6 depicts reconstructed radio signals of the terminal device UE1, and FIG. 7 depicts reconstructed radio signals of the terminal device UE2.

Figure 8:
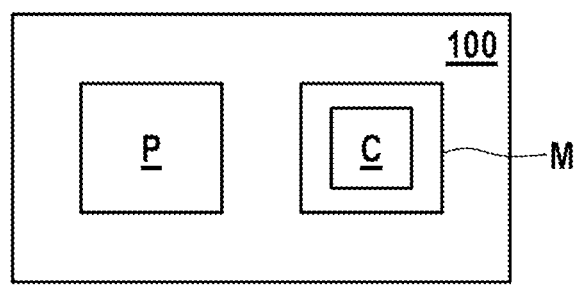

FIG. 8 depicts the device 100. Program instructions C are configured in such a way that, when the program instructions C are executed on a processor P, they carry out the method according to this description. The program instructions are stored on a nonvolatile, computer-readable storage medium M.

The device 100 for localizing a plurality of wireless terminal devices UE1, UE2 of a wireless communication network RCN thus comprises the processor P and the nonvolatile, computer-readable storage medium M which is linked to the processor P and which stores the program instructions C for execution by the processor P. The program instructions instruct the processor P to carry out the method steps described in this description.

The invention claimed is:

1. A method for localizing a plurality of wireless terminal devices (UE1, UE2) of a wireless communication network (RCN), the method comprising:

providing reception signals (s; s_AP1, s_AP2, s_AP3) which respectively comprise superposed radio signals (ts1, ts2) which were wirelessly received by a respective one of a plurality of receivers (AP1, AP2, AP3) which are arranged spatially separated from one another, wherein the superposed radio signals (ts1, ts2) originate from different ones of the wireless terminal devices (UE1, UE2), reconstructing the superposed radio signals (ts1, ts2) forming reconstructed radio signals (rs; rs1, rs2), as a function of the reception signals (s; s_AP1, s_AP2, s_AP3), and estimating spatial positions (pos; pos_UE1, pos_UE2) of the wireless terminal devices (UE1, UE2) as a function of the reconstructed radio signals (rs1, rs2).

2. The method according to claim 1, the method further comprising:

decoding a plurality of first packets (p1) as a function of a reception signal (s_AP1), encoding a plurality of first radio signals (c1) as a function of one of the plurality of first packets (p1), and determining a plurality of reconstructed second radio signals (rs2_AP1) by removing a first encoded radio signal (rs1a) from the reception signal (s_AP1).

3. The method according to claim 2, the method further comprising:

determining that a first superposed radio signal (ts1) received in the reception signal (s_AP1) has a higher SINR value and/or a higher received transmission power in comparison to a second superposed radio signal (ts2) contained in the reception signal (s_AP1), and reconstructing a second reconstructed radio signal (rs2) before the reconstruction of a first reconstructed radio signal (rs1), as a function of the aforementioned determination.

4. The method according to claim 3, the method further comprising:

reconstructing the first reconstructed radio signal (rs1) by removing at least the second reconstructed radio signal (rs2) from the reception signal (s_AP1).

5. The method according to claim 2, the method further comprising:

providing at least one channel estimation (ce1), wherein the at least one channel estimation (ce1) characterizes a state of a radio channel between one of terminal devices (UE1, UE2) and one of receivers (AP1, AP2, AP3), and encoding at least one of the plurality of first radio signals (c1) as a function of the plurality of the first packets (p1) and as a function of the the at least one channel estimation (ce1).

6. The method according to claim 1, the method further comprising:

providing spatial positions (pos_AP1, pos_AP2, pos_AP3) of the wireless receivers (AP1, AP2, AP3), determining distances (d11, d12, d13) between one of the wireless terminal devices (UE1) and a respective one of the wireless receivers (AP1; AP2; AP3), as a function of the reconstructed radio signals (rs1, rs2, rs3) which are allocated to the one wireless terminal device (UE1), and estimating a spatial position (pos1_UE1) of the one of the wireless terminal devices (UE1) as a function of the determined distances (d11, d12, d13) and as a function of the spatial positions (pos_AP1, pos_AP2, pos_AP3) of the wireless receivers (AP1, AP2, AP3).

7. A non-transitory, computer-readable storage medium (M) containing instructions that when executed by a computer cause the computer to provide reception signals (s; s_AP1, s_AP2, s_AP3) which respectively comprise superposed radio signals (ts1, ts2) which were wirelessly received by a respective one of a plurality of receivers (AP1, AP2, AP3) which are arranged spatially separated from one another, wherein the superposed radio signals (ts1, ts2) originate from different ones of the wireless terminal devices (UE1, UE2), reconstruct the superposed radio signals (ts1, ts2) forming reconstructed radio signals (rs; rs1, rs2), as a function of the reception signals (s; s_AP1, s_AP2, s_AP3), and estimate spatial positions (pos; pos_UE1, pos_UE2) of the wireless terminal devices (UE1, UE2) as a function of the reconstructed radio signals (rs1, rs2).

8. A device (100) for localizing a plurality of wireless terminal devices (UE1, UE2) of a wireless communication network (RCN), wherein the device (100) comprises: a processor (P), and a nonvolatile, computer-readable storage medium (M) which is linked to the processor (P) and which stores program instructions (C) for execution by the processor (P), wherein the program instructions instruct the processor (P):

to provide reception signals (s; s_AP1, s_AP2, s_AP3) which respectively comprise superposed radio signals (ts1, ts2) which were wirelessly received by a respective one of a plurality of receivers (AP1, AP2, AP3) which are arranged spatially separated from one another, wherein the superposed radio signals (ts1, ts2) originate from different ones of the wireless terminal devices (UE1, UE2), to reconstruct the superposed radio signals (ts1, ts2) forming reconstructed radio signals (rs; rs1, rs2), as a function of the reception signals (s; s_AP1, s_AP2, s_AP3), and to estimate the spatial positions (pos; pos_UE1, pos_UE2) of the wireless terminal devices (UE1, UE2) as a function of the reconstructed radio signals (rs1, rs2).

* * * * *